INVENTORS
KIKUO OKI
MAMORU YAMAGUCHI

United States Patent Office 3,304,551
Patented Feb. 14, 1967

3,304,551
AUTOMATIC LATITUDE AND LONGITUDE
CALCULATING SYSTEM
Kikuo Oki and Mamoru Yamaguchi, Minato-ku, Tokyo, Japan, assignors to Nippon Electric Company, Limited, Tokyo, Japan
Filed Jan. 20, 1964, Ser. No. 339,034
7 Claims. (Cl. 343—112)

The instant invention relates to devices for determining geographical location and more particularly to an all electronic system for calculating the position of a vessel by means of establishing a null relationship between incremental distances traveled by such vessel against changes in position recorded by the system upon movement of the vessel.

In cases where it is desired to calculate the position of a vessel, or submarine, sailing on the surface of the earth, such geographical indications may be derived either by radio means or by calculating the position through the method of astronomical observation. In the radio method accuracy of such a system decreases rapidly as the vessel moves increasingly further away from the transmitting station. While the astronomical observation method provides considerably high accuracy, its disadvantages lie in the fact that weather conditions quite frequently prevent use of the method.

The instant invention provides an automatic system for determining geographical location of a vessel utilizing a passive radar system and which is so designed as to operate effectively regardless of weather conditions.

The instant invention is comprised of electronic controlled platform means which is so arranged as to continuously adjust the physical position of the platform so that it always has the same relationship relative to the core of the earth. The platform is further provided with accelerometer devices for measuring acceleration of the platform in the $x$ and $y$ directions in the horizontal plane. The acceleration measurements undergo a first integration operation in order to obtain velocity components in the $x$ and $y$ directions and then undergo a second integration operation to obtain distance measurements in the $x$ and $y$ directions.

A passive radar unit is also provided and is arranged on a suitable gimbal designed to operate under the control of the aforementioned platform means so that its relationship relative to the core of the earth is identical with that of the platform means. The passive radar unit is electronically controlled to face in the direction of impinging electromagnetic waves from a source in space. The angle of incidence relative to the horizon is determined by the position of the radar antenna and the azimuth of the electromagnetic wave source in space is also detected. This information is utilized to determine the position of the vessel in the form of a latitude and longitude reading.

With the position of the space object being known, the last latitude and longitude reading generated by means of the passive radar unit establishes the position of the vessel upon which the system is mounted. Immediately thereafter the vessel may experience movement in either the $x$ or $y$ direction in the horizontal plane thus affecting the last calculated position of the vessel. This causes the accelerometers mounted on the platform means to generate new acceleration information in both the $x$ and $y$ directions. The passive radar system gimbal, due to the movement of the vessel continually undergoes adjustment in order to maintain its platform horizontal while tracking the space object generating the electromagnetic waves to obtain accurate angular data. After a predetermined time interval the new $x$ and $y$ coordinates developed as a result of the change in position of the passive radar system are compared against the $x$ and $y$ distance and velocity components generated by the accelerometer device and the associated integrating circuits. The passive radar system gimbal undergoes discrete step by step adjustments until the velocity and distance changes recognized by the accelerometers of the platform means and by the passive radar unit are equal to one another. At the time this null condition occurs the corrected latitudinal and longitudinal position of the vessel is established. These steps may be performed in an iterative manner until the null condition exists or may be limited to a discrete number of iterative steps depending only upon the accuracy desired in the system.

By adjusting the platform so that its relationship to the core of the earth is constant throughout motion of the ship and by controlling the passive radar to maintain the level position this limits the motion measurements to the $x$ and $y$ measurements which are the only ones needed to establish the latitudinal and longitudinal position of the vessel.

It is therefore one object of the instant invention to provide a novel automatic latitude and longitude calculating system for ocean going vessels and the like wherein a passive radar system is employed for establishing the position of the vessel relative to an object in space generating an electromagnetic wave source.

Another object of the instant invention is to provide an automatic latitude and longitude calculating system for ocean going vessels and the like wherein means are provided on the vessel to calculate the distance traveled within a given time interval and where these distances are compared against the angle data of the passive radar unit in order to establish a null condition for the purpose of accurately determining the latitudinal and longitudinal position of the vessel.

Still another object of the instant invention is to provide a novel automatic latitude and longitude calculating system for ocean going vessels and the like wherein means are provided for establishing the acceleration, velocity and distance traveled by the vessel, together with means provided for establishing the position of the vessel relative to an object in space emitting electromagnetic waves wherein the measurements from these two sources are compared to establish a null condition therebetween in order to accurately determine the latitudinal and longitudinal position of the vessel.

These and other objects of the instant invention will become apparent when reading the accompanying description and drawings in which.

Figure 1:
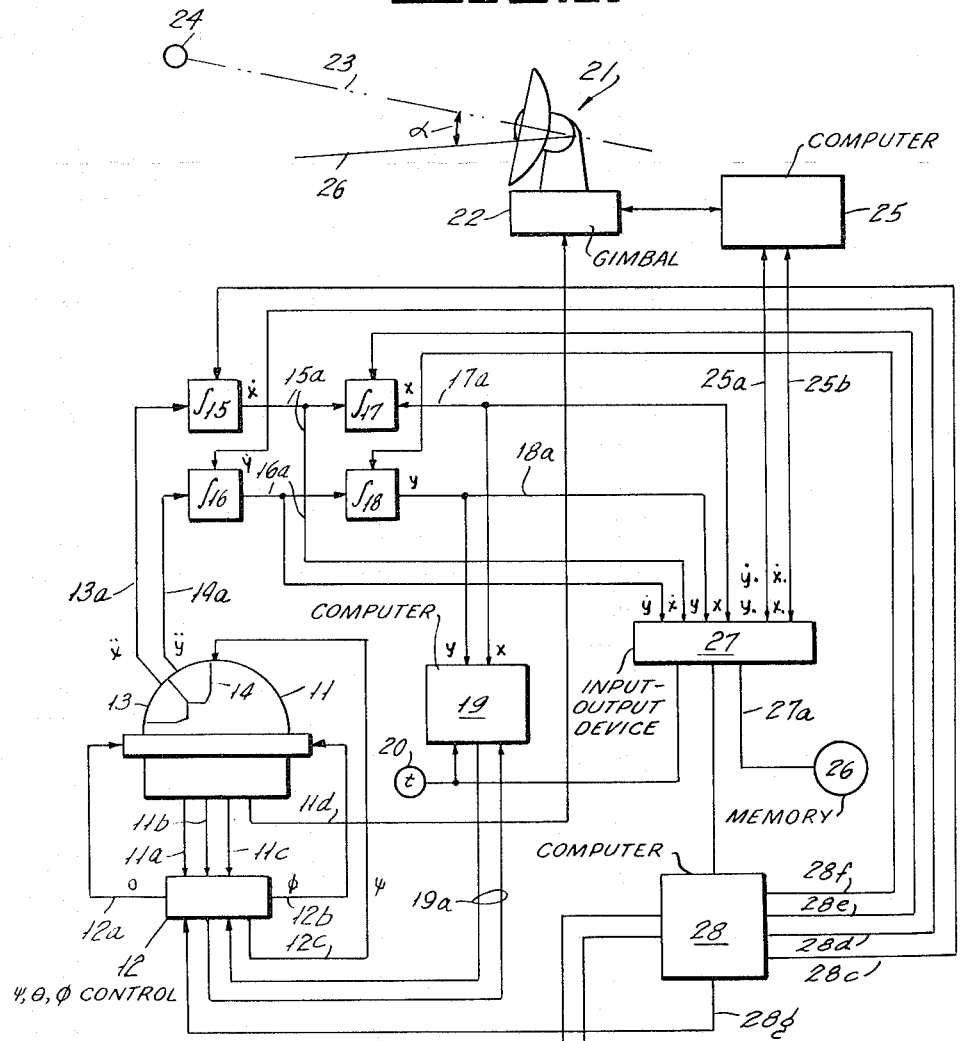
FIGURE 1 is a block diagram showing the automatic latitudinal and longitudinal calculating system of the instant invention.
Figure 2:
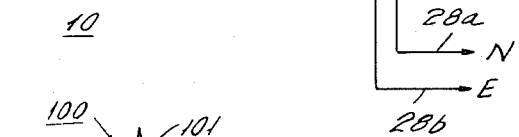
FIGURE 2 is a sketch of a vessel provided to facilitate the description of the instant invention.

Referring now to the drawings, FIGURE 1 shows an automatic latitude and longitude calculating system 10 comprised of a stable platform means 11 installed in a vessel or a submarine which may be sailing along the surface of the earth. Considering for a moment FIGURE 2, there is shown therein in diagrammatic form a vessel 100 which may be sailing along the surface of the earth, such as ocean, sea, et cetera. Such a vessel 100 may undergo rotation about a vertical axis 101 which is defined as the yaw experienced by the vessel. Any dipping or movement experienced about a first horizontal axis 102 is defined as the pitch experienced by the vessel 100. Finally, any motion of the vessel 100 experienced about the second horizontal axis 103 [which is perpendicular to the axes 101 and 102] is defined as the roll of the vessel 100. Since the system desires to determine movement of the vessel 100 in either the + or − $x$ direction and the + or − y direction in the horizontal plane it is important that the detectors provided to determine such movement in the x and y directions be mounted upon a platform which remains substantially in a horizontal plane at all times.

Thus the stable platform 11 is mounted upon a suitable gimbal which acts to stabilize platform 11 against pitching, rolling and yawing by means of the electronic control circuitry 12. The pitching, rolling and yawing rotational movements experienced by the vessel are impressed upon the control circuit 12 by means of the output leads 11a, 11b and 11c, respectively. The pitching, rolling and yawing adjustments to the stable platform 11 are generated by control circuit 12 and the appropriate adjusting signals appear at the output leads 12a, 12b and 12c, respectively, which adjustment signals are impressed upon the stable platform means 11 in order to maintain the platform to be oriented in the horizontal direction.

Platform 11 has mounted thereon first and second accelerometer devices 13 and 14, respectively, with the accelerometer device 13 being employed to detect acceleration of the vessel in the x direction [+ or −] and with the accelerometer 14 being provided to detect acceleration of the vessel in the [+ or −] y direction. These acceleration measurements in the form of signals identified as $\ddot{x}$ and $\ddot{y}$ are impressed, by means of leads 13a and 14a upon the integrating circuits 15 and 16 respectively. Integrating circuits 15 and 16 integrate the acceleration components to generate the velocity components $\dot{x}$ and $\dot{y}$, which signals appear at the output of leads 15a and 16a respectively.

These signals are impressed upon integrating circuits 17 and 18 which, in turn, integrate the velocity components $\dot{x}$ and $\dot{y}$ to generate the distance components x and y which appear at the output leads 17a and 18a respectively. The correcting value along the z axis 101 of FIGURE 2, which is perpendicular to the x–y plane of the stable platform 11, is calculated by utilizing the x and y distance signals appearing at the output terminals 17a and 18a. These signals are impressed upon the input of the computer 19 utilized by controlling circuit 12. The x and y signals together with the elapsed time t generated by source 20 is provided to establish the elapsed time required to traverse the distance measured. The input-output connections of computer 19 are employed to control the control circuit 12 and hence platform means 11 so that the z axis always is directed toward the core of the earth so as to form a Schuler pendulum.

A passive radar unit 21 is provided in the system 10 and is mounted upon a gimbal 22 and is electonically controlled to face in the direction of the impinging electromagnetic waves 23 emanating from an object 24 in space. The gimbal 22 is controlled by platform 11 which impresses the adjusting signals via lead 11d upon gimbal 22 in order to move the platform to the same horizontal position occupied by the platform 11 at any given moment. This is done by adjusting the pitching angle θ, the rolling angle Φ and the yawing angle Ψ in the same manner in which these angles are adjusted for the platform 11. The actual position of the vessel in the form of the coordinates $x_0$ and $y_0$ are calculated by a computer 25 which establishes these coordinates by utilizing first the angle of incidence α of the impinging electromagnetic wave 23 relative to the horizon 26 and also by establishing the azimuth of the space object 24 relative to the passive radar unit 21. Normally the azimuth is measured clockwise at the position of the observer from the north point of the horizon, but any other means of measuring may be employed. The values $\dot{x}$, $\dot{y}$, x, y, $x_0$, $y_0$ and t are memorized in a suitable memory device 26 after being inserted through the input-output device 27. All of these readings are impressed upon the input-output device 27 by leads 15a, 16a, 17a, 18a, 25a and 25b respectively, with the input-output device 27 being connected to memory 26 by lead[s] 27a.

All the information so stored is then applied to computer means 28 to be suitably processed in order to establish the latitudinal and longitudinal positions which are available at the output leads 28a and 28b respectively.

The computations are made by determining the deviations between $\dot{y}$ and $\dot{y}_0$; $\dot{x}$ and $\dot{x}$; y and $y_0$; and x and $x_0$. Any deviations between these readings are corrected by adjusting the integrating circuits 15–18 by means of output leads 28c–28f respectively, which integrating circuits 15–18 are adjusted until a null condition between the readings are obtained. In addition thereto the output lead 28g acts to adjust the control circuit 12 for platform 11 in order to correctly adjust the position of platform 11 in accordance with any deviations as between the velocity and distance measurements developed from the accelerometers 13 and 14 and from the passive radar unit and computer 21 and 25 respectively. As can clearly be seen from FIGURE 1, position information is inserted into the computer 28 of the passive radar computer 25. Time information is inserted into computer 28 through the input-output device 27 which is coupled to the timing source 20. The use of the time information, together with the position information, enables computer 28 to compute velocity information independently from the integrating devices 15 and 16. These separately and independently computed velocity values are then compared in computer 28 and employed for the purpose of adjusting the integrators 15–18 to null out any difference in the velocity and distance readings obtained. These adjustments are made through the leads 28c–28f, as shown in the figure. Other adjustment to obtain a null condition is made through the output lead 28g, as has been described above, for the purpose of adjusting control circuit 12. The instant invention enables the generation of an accurate value of the latitudinal and longitudinal coordinates x and y which are suitably corrected by the coordinates $x_0$ and $y_0$ obtained through the passive radar unit 21 and computer 25. The position at any given instant is calculated by the astronomical observation by means of the passive radar system which is taken over a sufficient amount of time as permitted by the accuracy of the detecting system.

The foregoing disclosure of the instant invention and the particular embodiments set forth therein is intended to be merely illustrative and it should be clearly understood that various modifications and substitutions are possible without departing from the scope of the invention. For example, in the data processing operation the actual values of latitude and longitude may be used instead of the coordinates x and y or the acceleration components $\ddot{x}$ and $\ddot{y}$ may be employed as the data for establishing the position of the vessel. In addition, as a further simplification, the Schuler pendulum system may be omitted.

What is claimed is:

1. An automatic latitude and longitude calculating system for use on a vessel or the like moving near the surface of the earth and within the range of a body in space emitting electromagnetic waves wherein the position of the body relative to earth can be determined, comprising:
    passive radar means for automatically tracking the source of the electromagnetic waves;
    first computer means coupled to said passive radar means for calculating position data during succeeding time intervals;
    means for storing said position data;
    platform means;
    first and second accelerometers positioned upon said platform means for detecting acceleration along two mutually perpendicular axes;
    first and second integrating means coupled respectively to said first and second accelerometer means for generating velocity data;
    third and fourth integrating means coupled respectively to said first and second integrating means for generating position data;

fifth means detecting the attitude of the vessel for maintaining said platform substantially horizontal relative to the earth;

second computer means for comparing position data derived from said third and fourth integrating means against position data derived from said first computer means;

said second computer means including means for adjusting said first through said fourth integrating means to null out differences between said position data being compared;

sixth means coupled between said second computer means and said platform means for adjusting said platform means to further null out differences in the position data being compared;

said radar means including gimbal means;

said sixth means controlling said gimbal means to maintain said gimbal means in substantially the same horizontal position as said platform means;

said second computer means including means for emitting longitude and latitude information when said position data information being compared is nulled out.

2. An automatic latitude and longitude calculating system for use on a vessel, or the like, moving near the surface of the earth and within the range of a body in space emitting electromagnetic waves wherein the position of the body relative to the earth can be determined, comprising:

passive radar means for automatically tracking the source of the electromagnetic waves;

first means for determining the velocity of said vessel at any moment $t$;

computer means responsive to said radar means for calculating the position of said vessel during periodic time intervals;

means for storing said position data;

said computer comprising second means for calculating the velocity of said vessel from the position data generated during said periodic time intervals; and third means for comparing the velocity data generated by said computer means and said first means;

fourth means responsive to said third means for adjusting said first means to obtain a null condition between the velocities generated by said first means and said computer means to automatically correct said system.

3. The system of claim 2 wherein said first means includes first and second accelerometers for generating acceleration data $\ddot{x}$ and $\ddot{y}$, respectively, responsive to the movement of said vessel.

4. The system of claim 3 further including first and second integrator means connected to said first and second accelerometers, respectively, for generating velocity data $\dot{x}$ and $\dot{y}$.

5. The system of claim 2 wherein said first means comprises first and second accelerometers for generating acceleration data $\ddot{x}$ and $\ddot{y}$, respectively, responsive to the movement of said vessel; first and second integrator means connected to said first and second accelerometers, respectively, for generating velocity data $\dot{x}$ and $\dot{y}$; third and fourth integrator means connected to said first and second integrator means, respectively, for generating distance data $x$ and $y$; said third means further including fifth means for comparing position data generated by said computer means and said third and fourth integrator means for adjusting said third and fourth integrator means to obtain a null condition between the position data generated by said third and fourth integrator means and said computer means to automatically correct said system.

6. An automatic latitude and longitude calculating system for use on a vessel, or the like, moving near the surface of the earth and within the range of a body in space emitting electromagnetic waves wherein the position of the body relative to earth can be determined, comprising:

passive radar means for automatically tracking the source of the electromagnetic waves;

first means for determining the velocity of said vessel at any moment $t$;

computer means responsive to said radar means for calculating the position of said vessel at successive predetermined time intervals;

means for storing the position data generated at said predetermined time intervals;

said computer means comprising second means for calculating the velocity of said vessel from the position data generated; and third means for comparing the velocity data generated by said computer means and said first means;

first platform means supporting said first means;

control means responsive to the pitching, rolling, yawning of the vessel for controlling said platform means to maintain a horizontal position relative to the earth;

said computer further comprising fourth means responsive to said third means for adjusting said control means to obtain a null condition between the velocities generated by said first means and said computer means to automatically correct said system.

7. The system of claim 6 wherein said passive radar means is further comprised of second platform means for supporting said radar means, gimbal means controlled by said control means for maintaining said radar second platform means in the same horizontal position as the platform means supporting said first means.

References Cited by the Examiner

UNITED STATES PATENTS 3,103,579   9/1963   Green _____ 343—112 X
3,194,949   7/1965   Jasperson _____ 235—150.27

RODNEY D. BENNETT, *Acting Primary Examiner.*

CHESTER L. JUSTUS, *Examiner.*

R. E. BERGER, *Assistant Examiner.*